United States Patent
Yoon et al.

(10) Patent No.: US 7,879,480 B2
(45) Date of Patent: Feb. 1, 2011

(54) BATTERY CARTRIDGE FOR NOVEL STRUCTURE AND OPEN TYPE BATTERY MODULE CONTAINING THE SAME

(75) Inventors: Junill Yoon, Seoul (KR); Jong-yul Ro, Seoul (KR); John E. Namgoong, Daejeon (KR); Do Yang Jung, Hwaseong-si (KR)

(73) Assignee: LG Chem, Ltd. (KR)

( * ) Notice: Subject to any disclaimer, the term of this patent is extended or adjusted under 35 U.S.C. 154(b) by 958 days.

(21) Appl. No.: 11/314,585

(22) Filed: Dec. 21, 2005

(65) Prior Publication Data

US 2007/0072066 A1   Mar. 29, 2007

(30) Foreign Application Priority Data

Dec. 24, 2004  (KR) .................... 10-2004-0111699

(51) Int. Cl.
*H01M 2/10* (2006.01)
*H01M 10/50* (2006.01)
*H01M 6/42* (2006.01)
*H01M 2/04* (2006.01)

(52) U.S. Cl. .............................. 429/99; 429/96; 429/98; 429/100; 429/120; 429/159

(58) Field of Classification Search .................. 429/99, 429/100, 87, 176, 120, 96–98; 180/65.21, 180/65.31; 903/907
See application file for complete search history.

(56) References Cited

U.S. PATENT DOCUMENTS

| | | | | |
|---|---|---|---|---|
| 5,589,290 | A * | 12/1996 | Klink et al. | 429/99 |
| 6,406,812 | B1 * | 6/2002 | Dreulle et al. | 429/99 |
| 6,475,659 | B1 * | 11/2002 | Heimer | 429/66 |
| 2001/0046624 | A1 * | 11/2001 | Goto et al. | 429/99 |
| 2003/0082440 | A1 * | 5/2003 | Mrotek et al. | 429/123 |
| 2004/0021442 | A1 * | 2/2004 | Higashino | 320/112 |

FOREIGN PATENT DOCUMENTS

WO    WO 03071616    *  8/2003

* cited by examiner

*Primary Examiner*—Gregg Cantelmo
*Assistant Examiner*—Eugenia Wang
(74) *Attorney, Agent, or Firm*—Cantor Colburn LLP (57) ABSTRACT

A battery cartridge includes a pair of outer frame members for receiving unit cells and an inner frame member disposed between the outer frame members. The unit cells are mounted between the outer and inner frame members. The inner frame member has a plurality of through-holes, which communicate with the outside while the unit cells are mounted between the outer and inner frame members. An opened type battery module includes such a battery cartridge. The battery cartridge and the battery module have a high structural integration and mechanical strength. Consequently, the present invention has the effect of minimizing the size of a battery system, stably mounting unit cells having low mechanical strength, and effectively removing heat from the unit cells.

8 Claims, 7 Drawing Sheets

BATTERY CARTRIDGE FOR NOVEL STRUCTURE AND OPEN TYPE BATTERY MODULE CONTAINING THE SAME

FIELD OF THE INVENTION

The present invention relates to a battery cartridge having a novel structure and an open type battery module including the same, and, more particularly, to a battery cartridge comprising two outer frame members and an inner frame member disposed between the outer frame members wherein one or more unit cells are mounted between the outer and inner frame members, and the inner frame member has through-holes, and an open type battery module including the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles and hybrid electric vehicles, which have been developed to solve problems, such as air pollution, caused by existing gasoline and diesel vehicles using fossil fuel.

Small-sized mobile devices use one or more unit cells, for example, three or four unit cells, for each device. To the contrary, medium- or large-sized devices, such as vehicles, use a medium- or large-sized battery system comprising a plurality of unit cells electrically connected with each other as a high-output, large-capacity battery is required.

As the unit cell for the medium- or large-sized battery system is widely used a pouch-shaped secondary cell, which is generally packaged in a battery case made of a laminate sheet consisting of aluminum and polymer resin, and therefore, the mechanical strength of the pouch-shaped secondary cell is not high. For this reason, a plurality of unit cells are mounted in a battery cartridge, where the unit cells are connected in series or parallel, and a plurality of battery cartridges are electrically connected with each other to constitute a battery module.

A battery module widely used for hybrid electric vehicles has a closed structure in which an electrolyte cannot leak from each unit cell (secondary cell). That is to say, the closed type battery module has an advantage of preventing leakage of the electrolyte. However, the closed type battery module has problems in that heat generated in unit cells is accumulated, and the accumulated heat accelerates the deterioration of the cells and that a small or large number of unit cells are overheated when they are operated abnormally, and therefore, the unit cells may fire or explode. Lithium-ion secondary cells or lithium-ion polymer secondary cells, which are currently generating much interest in the potential uses of unit cells, generate heat while the secondary cells are charged and discharged. When such heat is continuously accumulated in the unit cell, the deterioration of the unit cell is accelerated, and furthermore, the unit cell may fire or explode.

Consequently, it is necessary to provide a medium- or large-sized battery system that is capable of stably mounting unit cells having low mechanical strength, effectively removing heat from the unit cells, and preventing the unit cells from overheating when the unit cells are operated abnormally, thereby improving the service life and safety of the unit cells.

SUMMARY OF THE INVENTION

Accordingly, it is an object of the present invention to substantially obviate the above-mentioned problems of the conventional arts as well as the technical problems requested from the past.

A first object of the present invention is to provide a battery cartridge whose structural integration and mechanical strength are high, thereby minimizing the size of a battery system, stably mounting unit cells having low mechanical strength, effectively removing heat from the unit cells, and preventing the unit cells from overheating.

A second object of the present invention is to provide a battery module including a plurality of battery cartridges wherein the battery cartridges are mounted in the battery module with high integration and mechanical strength, while accomplishing effective heat removal, such that the battery module can be used in a high-output, large-capacity battery system.

In accordance with the present invention, the above and other objects can be accomplished by the provision of a battery cartridge comprising: a pair of outer frame members (a, b) for receiving unit cells; and an inner frame member (c) disposed between the outer frame members (a, b), wherein one of the unit cells is mounted between the first outer frame member (a) and the inner frame member (c), the other unit cell is mounted between the second outer frame member (b) and the inner frame member (c), and the inner frame member (c) has a plurality of through-holes, which communicate with the outside while the unit cells are mounted between the outer and inner frame members.

According to the present invention, the first outer frame member (a), the first unit cell, the inner frame member (c), the second unit cell, and the second outer frame member (b) are coupled to each other while being sequentially stacked one on another. Consequently, the unit cells, the mechanical strength of which is low, can be stably mounted in the battery cartridge. Furthermore, the battery cartridge having the above-stated structure can be stacked one on another with high integration, and therefore, the size of a battery system is minimized.

In the specification, a "cartridge member" means a lattice-shaped structure formed in the shape of a rectangle corresponding to that of each unit cell and having a hollow part defined therein.

While the unit cells are mounted in the coupled structure of the outer frame members (a, b) and the inner frame member (c), the space between the unit cells communicates with the outside through the through-holes formed at the inner frame member (c). Also, the almost whole surfaces of the unit cells are exposed to the outside through the hollow parts of the outer frame members (a, b). Consequently, release of heat from the unit cells is effectively accomplished by the provisions of the through-holes of the inner frame member and the hollow parts of the outer frame members.

According to circumstances, the inner frame member (c) is provided at the upper end and/or the lower end thereof with grooves, and the through-holes are formed by the grooves while the inner frame member (c) is coupled to the outer frame members (a, b).

In the specification, the "through-holes" include external air passageways directly formed through the inner frame member (c) and external air passageways formed when the inner frame member (c) is coupled to the outer frame members (a, b).

In a preferred embodiment, the outer frame members (a, b) and/or the inner frame member (c) may include one or more supporting bars, which traverse hollow parts defined in the outer frame members (a, b) and/or the inner frame member (c) for more stably supporting the unit cells.

The number of unit cells mounted between the first outer frame member (a) and the inner frame member (c) and unit cells mounted between the second outer frame member (b)

and the inner frame member (c) is not particularly restricted. One or more unit cells may be mounted between the respective frame members. When the number of unit cells mounted between the outer frame member (a or b) and the inner frame member (c) is two or more, the unit cells are arranged side by side, not stacked, so as to accomplish the effective release of heat. Also, when two or more unit cells are mounted between the outer frame member (a or b) and the inner frame member (c), the supporting bars form stably supporting the unit cells may be formed at the outer frame members and/or the inner frame member such that the supporting bars are disposed between the neighboring unit cells.

A plurality of battery cartridges may be successively stacked while the unit cells are mounted in each battery cartridge. In this case, closed spaces are defined between the stacked battery cartridges. The closed spaces are formed by the neighboring outer frame members and the unit cells. Consequently, it is preferable that the outer frame members (a, b) be provided at the outer surfaces thereof with pluralities of grooves, which form air passageways when the outer frame members (a, b) are connected with outer frame members of the neighboring battery cartridges in a stacked fashion, thereby accomplishing a more effective release of heat.

The outer frame members (a, b) and/or the inner frame member (c) have depressions corresponding to the thickness of electrode leads of the unit cells such that the electrode leads of the unit cells are exposed at the coupling area of the outer frame members (a, b) and the inner frame member (c) while the inner frame member (c) is coupled to the outer frame members (a, b).

The coupling between the frame members is not particularly restricted. For example, the coupling between the frame members may be accomplished by means of bolt/nut connection, riveting, welding, adhesives, or male and female screw engagement.

Also, the material for the frame members is not particularly restricted. The frame members may be made of various materials, such as plastic resin or metal. In the case that the frame members are made of metal, however, it is necessary to electrically insulate the exposed parts of the electrode leads.

The secondary unit cells mounted in the battery cartridge are cells that can be charged and discharged. Preferably, rectangular cells or pouch-shaped cells, which accumulate electricity with high integration (high density), are used as the unit cells. More preferably, the pouch-shaped cells are used as the unit cells.

Each of the unit cells has an anode, a cathode, a separation film, and an electrolyte mounted in a sealed cell case. Each of the unit cells has a jelly-roll type structure in which an electrode assembly including a minute porous separation film between a thin film-shaped anode and cathode is wound, or a stack type structure in which fullcells or bicells of anode/separation film/cathode are sequentially stacked one on another. Active materials applied to the anode and the cathode are not particularly restricted. Preferably, the anode active material consists of lithium manganese-based oxide having high safety, and the cathode active material consists of carbon. The preferable unit cell is a lithium-ion cell or a lithium-ion polymer cell.

Also, the present invention provides a battery module including a plurality of battery cartridges electrically connected with each other.

Specifically, the battery module according to the present invention comprises: a cartridge assembly including two or more battery cartridges as described above; a box-shaped case having an opened front part and an inner space for inserting and mouthing the cartridge assembly, the case being provided at least one of the upper end, the lower end, the left side, the right side, and the rear part thereof with a plurality of slits; and a front plate attached to the opened front part of the case.

The battery cartridges are stacked one on another, the stacked battery cartridges are mounted in the inner space of the case, and then the front plate is securely attached to the opened front part of the case. Consequently, heat generated from the unit cells is effectively discharged from the battery module by external air introduced into the case through the slits formed in the case.

The electrical connection between the battery cartridges may be carried out before or after the cartridges are mounted in the case. For example, the bus bars are located between the rear surface of the front plate and the battery cartridges while the battery cartridges are mounted in the case, and then a welding process is performed to accomplish the electrical connection between the battery cartridges.

Preferably, the battery module further comprises: a battery management system (BMS) including a circuit for maintaining potential difference between the unit cells at an appropriate level and preventing overcharging and/or overdischarging of the unit cells, and a printed circuit board (PCB) including a circuit for measuring the voltage and the temperature of the unit cells. In a preferred embodiment, the BMS is mounted at the side surface of the case, and the PCB is mounted at the rear surface of the front plate.

Also, a plurality of battery modules may be electrically connected with each other to manufacture a high-output, large-capacity battery system (or battery pack). Preferably, the battery system may include additional coupling members for effectively coupling the battery modules.

The battery system according to the present invention may be used as a high-output, large-capacity battery system. For example, the battery system may be used as a battery system for electric vehicles and hybrid electric vehicles, preferably, hybrid electric vehicles.

BRIEF DESCRIPTION OF THE DRAWINGS

The above and other objects, features and other advantages of the present invention will be more clearly understood from the following detailed description taken in conjunction with the accompanying drawings, in which.

<Description of Main Reference Numerals of the Drawings>

100: outer frame member
200: inner frame member
300: battery cartridge
400: unit cells
500: battery module
600: case
700: front plate
800: BMS cover

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
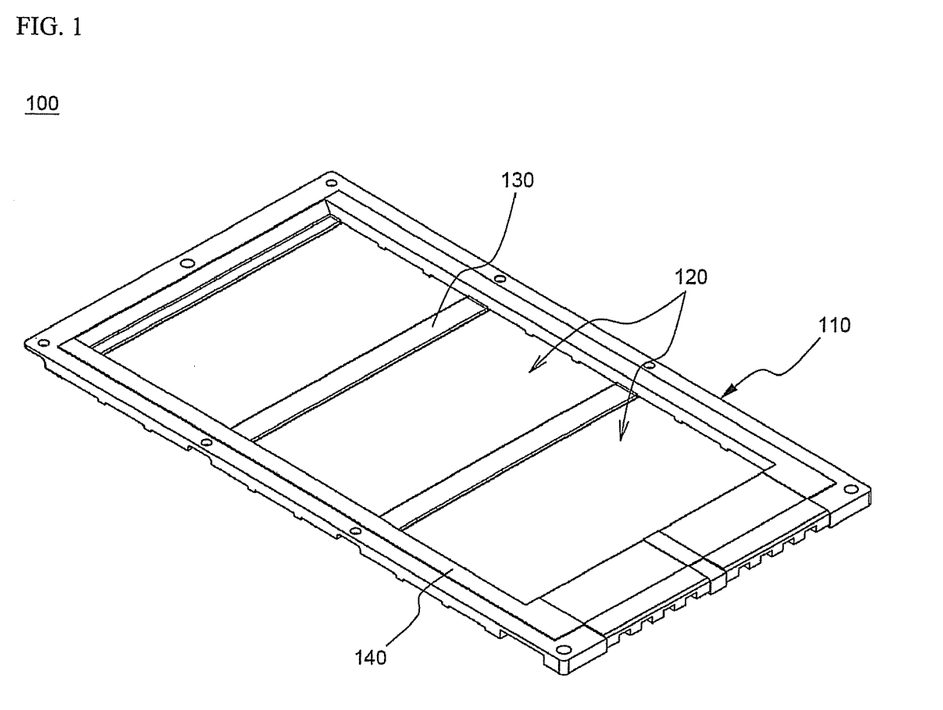
FIG. 1 is a perspective view illustrating an outer frame member according to a preferred embodiment of the present invention.
Figure 2:
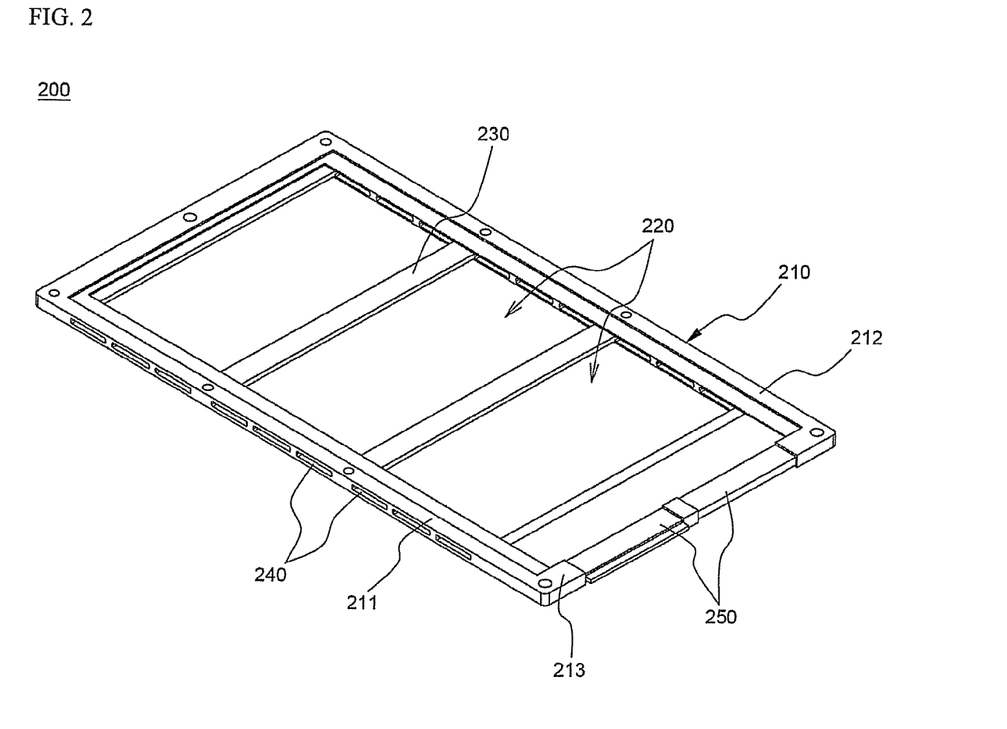
FIG. 2 is a perspective view illustrating an inner frame member according to a preferred embodiment of the present invention.
Figure 3:
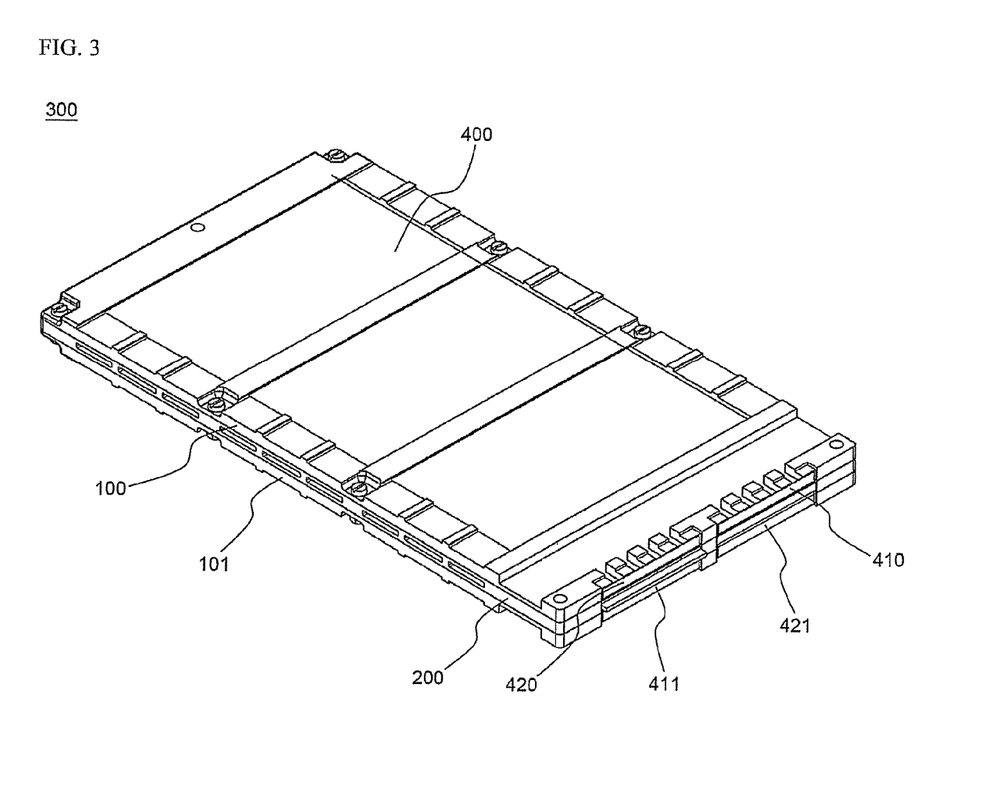
FIG. 3 is a perspective view illustrating two unit cells mounted between a pair of outer frame members as shown in FIG. 1 and an inner frame member as shown in FIG. 2.

FIG. 1 is a perspective view illustrating an outer frame member 100 according to a preferred embodiment of the present invention, FIG. 2 is a perspective view illustrating an inner frame member 200 according to a preferred embodiment of the present invention, and FIG. 3 is a perspective view illustrating two unit cells mounted between a pair of outer frame members as shown in FIG. 1 and an inner frame member as shown in FIG. 2.

Referring first to FIG. 1, the outer frame member 100 includes a rectangular frame 110 having a hollow part 120 defined therein and supporting bars 130 attached to the rectangular frame 110 while traversing the hollow part 120. For example, a pouch-shaped unit cell (not shown) is put on the frame 110 while the edge part of the unit cell is placed at an inside part 140 of the frame 110.

Referring to FIG. 2, the inner frame member 200 includes a rectangular frame 210 having a hollow part 220 defined therein and supporting bars 230 attached to the rectangular frame 210 while traversing the hollow part 220. At the left side of the frame 210, i.e., a left frame part 211, and at the right side of the frame 210, i.e., a right frame part 212, are formed pluralities of through-holes 240. At the upper end of the frame 210, i.e., an upper frame part 213, are formed two depressions 250, at which electrode leads (not shown) protrude.

According to the present invention, a pair of outer frame members (see FIG. 1) are arranged opposite to each other while an inner frame member (see FIG. 2) is disposed between the outer frame members, unit cells are mounted between the inner frame member and the outer frame members, and then the frame members are securely coupled to each other to manufacture a battery cartridge.

FIG. 3 illustrates a battery cartridge 300 according to a preferred embodiment of the present invention manufactured as described above.

Referring to FIG. 3, the battery cartridge 300 has a structure in which a first outer frame member 100 and a second outer frame member 101 are coupled to each other, while an inner frame member is disposed between the first and second outer frame members 100 and 101, such that unit cells 400 are mounted between the frame members. A unit cell is mounted between the first outer frame member 100 and the inner frame member 200, and another unit cell is mounted between the inner frame member 200 and the second outer frame member 101. Consequently, two unit cells are mounted in the battery cartridge 300. As described above, however, the number of unit cells mounted between the first outer frame member 100 and the inner frame member 200 may be two or more. Similarly, the number of unit cells mounted between the second outer frame member 101 and the inner frame member 200 may be two or more.

The first unit cell 400 mounted between the first outer frame member 100 and the inner frame member 200 has an anode lead 410 and a cathode lead 420, which are exposed at the upper end of the battery cartridge 300. The second unit cell (not shown) mounted between the second outer frame member 101 and the inner frame member 200 has an anode lead 411 and a cathode lead 421, which are also exposed at the upper end of the battery cartridge 300. The anode lead 410 of the first unit cell 400 is connected to the cathode lead 421 of the second unit cell, and the cathode lead 420 of the first unit cell 400 is connected to an anode lead of a unit cell of another battery cartridge A, which will be stacked on the battery cartridge 300, whereby the unit cells are connected in series with each other. In the same manner, the anode lead 411 of the second unit cell is connected to a cathode lead of a unit cell of yet another battery cartridge B, which will also be stacked on the battery cartridge A.

Figure 4:
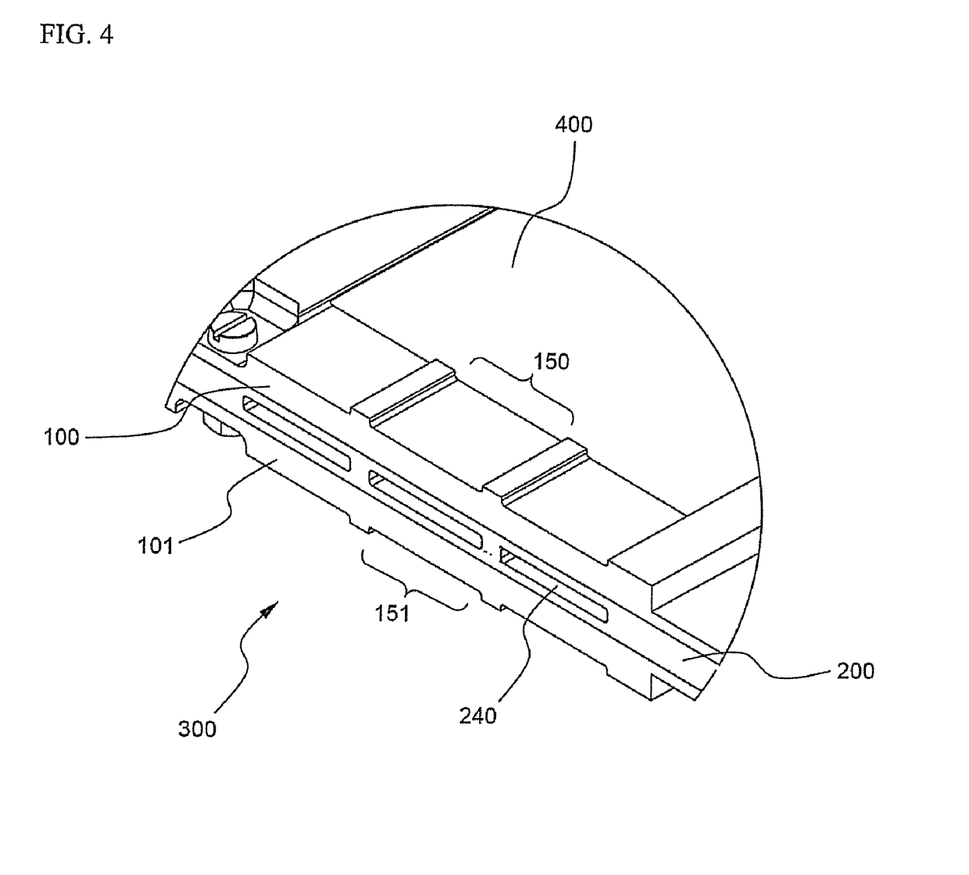
FIG. 4 is a partially enlarged view illustrating the coupling between the outer frame members and the inner frame member shown in FIG. 3.

FIG. 4 is a partially enlarged view illustrating the coupling between the outer frame members 100 and 101 and the inner frame member 200.

Referring to FIG. 4, the space defined between the unit cells 400 by the coupling between the outer frame members 100 and 101 and the inner frame member 200 communicates with the outside through the through-holes 240. Consequently, external cooling air, which is introduced into the battery cartridge through the through-holes 240, effectively removes heat generated from the unit cells 400, and is then discharged to the outside through the through-holes 240. Also, the outer surfaces of the unit cells 400 are exposed through the hollow parts 120 (see FIG. 1) of the outer frame members, and therefore, heat removal is effectively accomplished.

When a plurality of battery cartridges 300 are stacked one on another to manufacture a battery module, the spaces defined between the stacked battery cartridges 300 are closed, and therefore, heat generated from the unit cells 400 may accumulate in the battery module. For this reason, a plurality of grooves 150 and 151 are formed at the outer surfaces of the outer frame members 100 and 101, and therefore, the spaces defined between the stacked battery cartridges 300 communicate with the outside.

Figure 5:
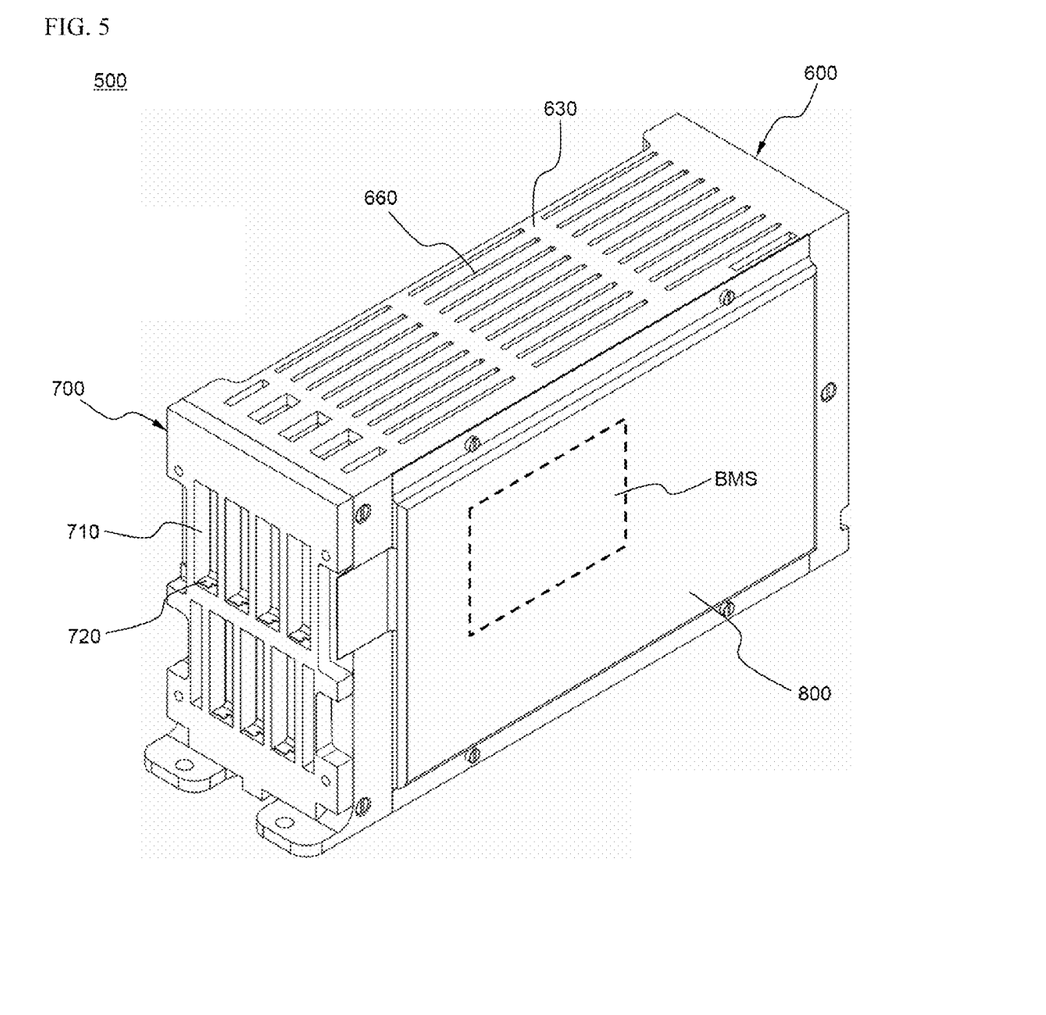
FIG. 5 is a perspective view illustrating a battery module according to a preferred embodiment of the present invention.
Figure 6:
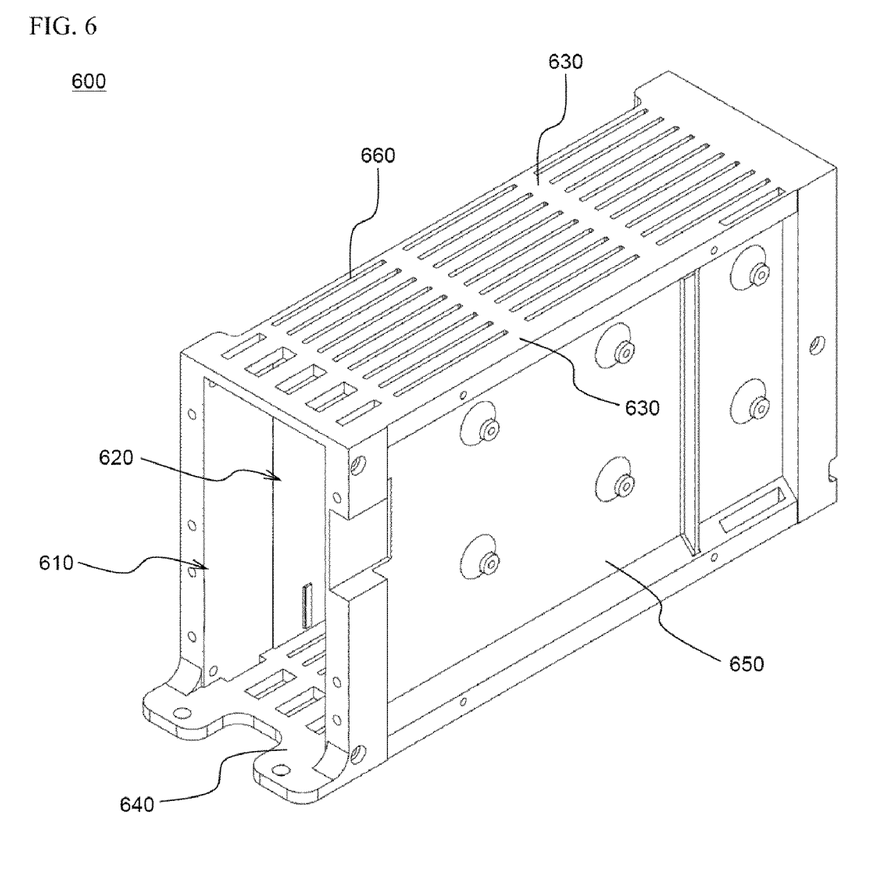
FIG. 6 is a perspective view illustrating a case of the battery module shown in FIG. 5.

FIG. 5 is a perspective view illustrating a battery module 500 according to a preferred embodiment of the present invention. FIG. 6 is a perspective view illustrating a 600 case of the battery module 500, and FIG. 7 is a perspective view illustrating a front plate 700 of the battery module 500.

Referring first to FIG. 6, the case 600 includes an opened front part 610 and an inner space 620 for receiving a plurality of battery cartridges 300 (see FIG. 3). The case 600 is formed approximately in the shape of a box. The case 600 is provided at the upper end 630 and the lower end 640 thereof with pluralities of slits 660 communicating with the inner space 620. According to circumstances, the slits 660 may also be formed at the rear part (not shown) of the case 600. At the side part 650 of the case 600 is mounted a battery management system (BMS).

Figure 7:
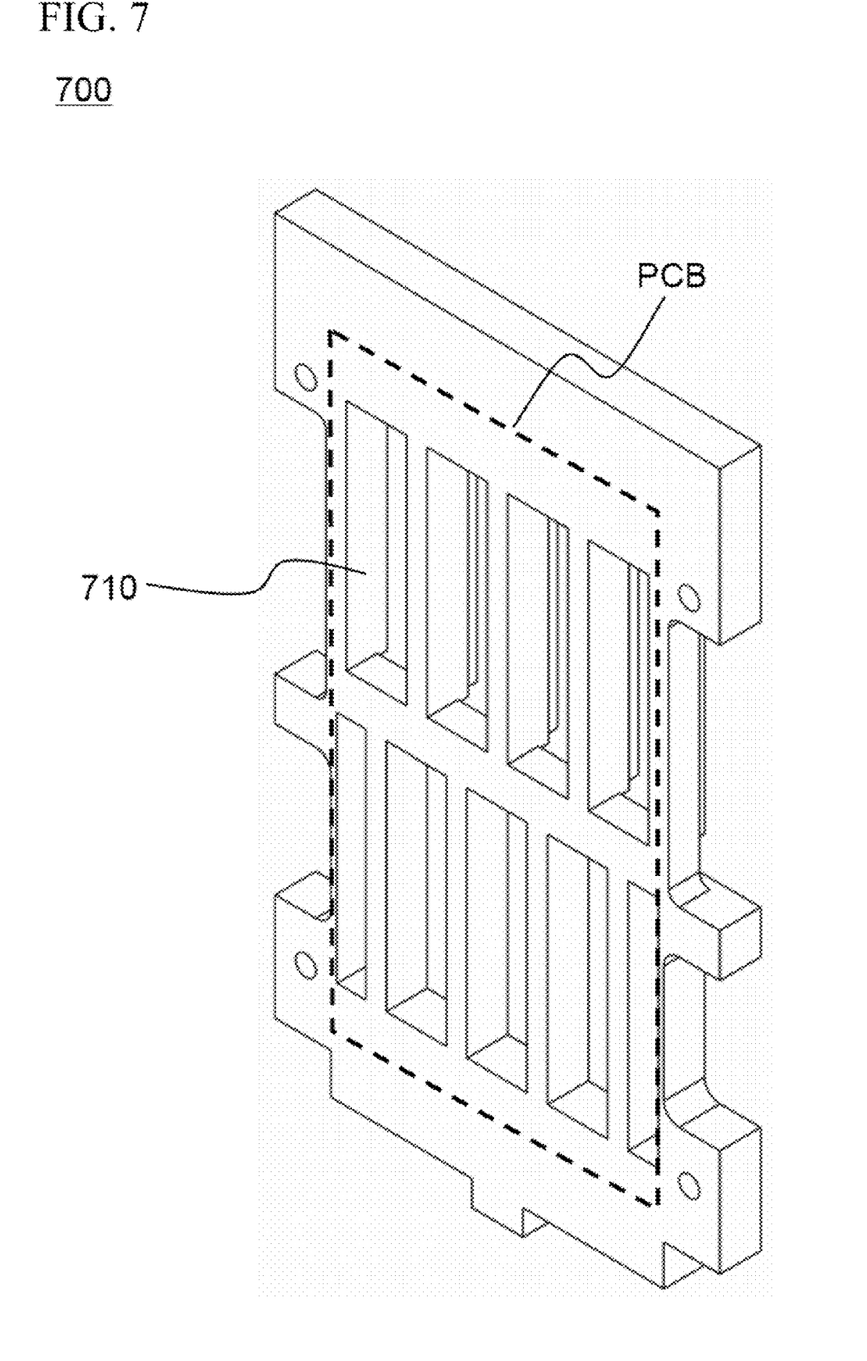
FIG. 7 is a perspective view illustrating a front plate of the battery module shown in FIG. 5.

Referring to FIG. 7, the front plate 700 has a size corresponding to that of the opened front part 610 of the case 600 (see FIG. 6) such that the front plate 700 can be attached to the opened front part 610 of the case 600. The front plate 700 is formed approximately in the shape of a plate. To the rear surface of the front plate 700 are attached bus bars (not shown) for enabling the electrical connection between the unit cells 400 (see FIG. 3) and/or the electrical connection between the battery cartridges 300 (see FIG. 4). Through the front plate 700 are formed a plurality of openings 710, through which the bus bars are attached to the rear surface of the front plate 700. To the rear surface of the front plate 700 are also attached a printed circuit board (PCB), which is not shown. The PCB includes a circuit for measuring potential difference between the unit cells 400 and/or temperatures of the unit cells 400.

Referring to FIG. 5, the front plate 700 is attached to the case 600 while a plurality of battery cartridges (not shown) are mounted in the inner space 620 of the case 600, and a BMS cover 800 is attached to the case 600 while the BMS is mounted on the case 600, whereby the battery module 500 is completed. The bus bars 720 are partially exposed through the openings 710 of the front plate 700. Preferably, the BMS cover 800 is made of a metal sheet for protecting the BMS from external electromagnetic waves and physical impacts.

A plurality of battery modules 500 as shown in FIG. 5 are successively stacked, while the battery modules 500 are electrically connected with each other, to manufacture a high-output, large-capacity battery pack (not shown). This battery pack is very useful as a power source for electric vehicles, especially, hybrid electric vehicles.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery cartridge and the battery module including the battery cartridge have a high structural integration and mechanical strength. Consequently, the present invention has the effect of minimizing the size of a battery system, stably mounting unit cells having low mechanical strength, and effectively removing heat from the unit cells.

What is claimed is:

1. A battery cartridge comprising:
    first and second outer frame members (a, b) for receiving first and second unit cells; and
    an inner frame member (c) disposed between the outer frame members (a, b), wherein the first unit cell is mounted between the first outer frame member (a) and the inner frame member (c),
    the second unit cell is mounted between the second outer frame member (b) and the inner frame member (c),
    the inner frame member (c) has a plurality of through-holes, which directly communicate with external air outside of the battery cartridge while the first and second unit cells are mounted between the outer and inner frame members,
    wherein the first and second unit cells are pouch-shaped cells formed in a shape of a rectangle, and
    the first unit cell is disposed on the first outer frame member (a) while an edge part of the first unit cell is disposed on an inside part of the first and second outer frame member (a), and
    the inner frame member (c) has a left frame part and a right frame part, and
    the plurality of through-holes are formed through the left frame part and the right frame part of the inner frame member (c) at a direction horizontal to the inner frame member (c), and
    the first and second outer frame members (a, b) and/or the inner frame member (c) have depressions corresponding to a thickness of electrode leads of the first and second unit cells such that at least a portion of the electrode leads of the first and second unit cells extend through the depressions and are disposed external of the first and second outer frame members (a, b) and/or the inner frame member (c) when the inner frame member (c) is coupled to the first and second outer frame members (a, b).

2. The battery cartridge as set forth in claim 1, wherein the first and second outer frame members (a, b) and/or the inner frame member (c) include one or more supporting bars, which traverse hollow parts defined in the first and second outer frame members (a, b) and/or the inner frame member (c) for more stably supporting the first and second unit cells.

3. The battery cartridge as set forth in claim 1, wherein the first and second outer frame members (a, b) are provided at outer surfaces thereof with pluralities of grooves, which form air passageways when the first and second outer frame members (a, b) are connected with outer frame members of neighboring battery cartridges in a stacked fashion.

4. The battery cartridge as set forth in claim 1, wherein the first and second unit cells are pouch-shaped lithium-ion polymer cells.

5. A battery module comprising:
    a cartridge assembly including two or more battery cartridges as set forth in claim 1;
    a box-shaped case having an opened front part and an inner space for inserting and mounting the cartridge assembly, the case being provided at least one of an upper end, a lower end, a left side, a right side, and a rear part thereof with a plurality of slits; and
    a front plate attached to the opened front part of the case.

6. The battery module as set forth in claim 5, further comprising:
    a battery management system (BMS) including a circuit for maintaining potential difference between the first and second unit cells at an appropriate level and preventing overcharging and/or overdischarging of the first and second unit cells, and/or
    a printed circuit board (PCB) including a circuit for measuring a voltage and a temperature of the first and second unit cells.

7. The battery module as set forth in claim 6, wherein the BMS is mounted at a left side or a right side of the case, and the PCB is mounted at a rear surface of the front plate.

8. A high-output, large-capacity battery system manufactured by electrically connecting a plurality of battery modules as set forth in claim 5.

* * * * *